US011424907B2

(12) United States Patent
Ghosh et al.

(10) Patent No.: US 11,424,907 B2
(45) Date of Patent: Aug. 23, 2022

(54) COUNTERMEASURES FOR SIDE-CHANNEL ATTACKS ON PROTECTED SIGN AND KEY EXCHANGE OPERATIONS

(71) Applicant: Intel Corporation, Santa Clara, CA (US)

(72) Inventors: Santosh Ghosh, Hillsboro, OR (US); Andrew H. Reinders, Portland, OR (US); Joseph Friel, Chandler, AZ (US); Avinash Laxmisha Varna, Chandler, AZ (US); Manoj Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/911,261

(22) Filed: Jun. 24, 2020

(65) Prior Publication Data

US 2021/0409188 A1     Dec. 30, 2021

(51) Int. Cl.
*H04L 9/00* (2022.01)
*G06F 7/72* (2006.01)
(Continued)

(52) U.S. Cl.
CPC .............. *H04L 9/002* (2013.01); *G06F 7/722* (2013.01); *G06F 7/725* (2013.01); *H04L 9/085* (2013.01);
(Continued)

(58) Field of Classification Search
CPC ....... H04L 9/002; H04L 9/085; H04L 9/3252; H04L 2209/08; G06F 7/722; G06F 7/725
See application file for complete search history.

(56) References Cited

U.S. PATENT DOCUMENTS

2005/0169462 A1   8/2005 Jung et al.
2008/0273695 A1*  11/2008 Al-Gahtani ............. G06F 7/725
                                                            380/30
(Continued)

FOREIGN PATENT DOCUMENTS

| CN | 113839781 A | 12/2021 |
|----|-------------|---------|
| EP | 1296224 A1  | 3/2003  |
| EP | 3930252 A1  | 12/2021 |

OTHER PUBLICATIONS

Extended European Search Report for EP Application No. 20208019.8, dated Mar. 5, 2021, 8 pages.

*Primary Examiner* — Ashokkumar B Patel
*Assistant Examiner* — William B Jones
(74) *Attorney, Agent, or Firm* — Jaffery Watson Mendonsa & Hamilton LLP

(57) ABSTRACT

Embodiments are directed to countermeasures for side-channel attacks on protected sign and key exchange operations. An embodiment of storage mediums includes instructions for commencing a process including an elliptic curve scalar multiplication (ESM) operation including application of a secret scalar value; splitting the secret scalar value into two random scalar values; counting a number of leading '0' bits in the scalar value and skipping the number of leading '0' bits in processing; performing an ESM iteration for each bit of the secret scalar value beginning with a most significant '1' bit of the scalar value including a Point Addition operation and a Point Double operation for each bit on randomized points; performing ESM operation dummy iterations equal to the number of leading '0' bits; and returning an output result for the ESM operation.

19 Claims, 18 Drawing Sheets

(51) Int. Cl.
*H04L 9/08* (2006.01)
*H04L 9/32* (2006.01)

(52) U.S. Cl.
CPC ........ *H04L 9/3252* (2013.01); *H04L 2209/08* (2013.01)

(56) References Cited

U.S. PATENT DOCUMENTS

2016/0352509 A1    12/2016  Wu et al.
2018/0062844 A1*   3/2018   Dubeuf .................. H04L 9/004
2020/0162243 A1*   5/2020   Fletcher ................... H04L 9/30

\* cited by examiner

COUNTERMEASURES FOR SIDE-CHANNEL ATTACKS ON PROTECTED SIGN AND KEY EXCHANGE OPERATIONS

TECHNICAL FIELD

Embodiments described herein generally relate to the field of electronic devices and, more particularly, countermeasures for side-channel attacks on protected sign and key exchange operations.

BACKGROUND

Cryptography is implemented in computing systems to provide for secure data storage and communication, including security against side-channel attacks (SCAs). A side channel attack is an attack based on leaked information in a computing system, such as in the form of power consumption, electromagnetic emissions, or other signal observations from a circuit.

In particular, certain secure operations, such as ECDSA (Elliptic Curve Digital Signature Algorithm) Sign and ECDH (Elliptic Curve Diffie-Hellman), apply elliptic curve scalar multiplication (ESM) to perform platform attestation and key exchange. ECDSA Sign and ECDH operations may be utilized to successfully provide high security based on a secret key because of the extreme difficulty in factoring the calculation based on elliptic curve output values.

However, advanced hardware attacks based on power or electromagnetic (EM) side channels can reveal the secret key used in these operations. In such an attack, an adversary may be able to exploit ESM operation through power/electromagnetic side channels to extract the integer scalar that is the secret key used for ECDSA Sign and ECDH operations, and thereby allow for defeating the security measures implemented for a system. As a result, additional countermeasures may be necessary for protected sign and key exchange operations.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1A:
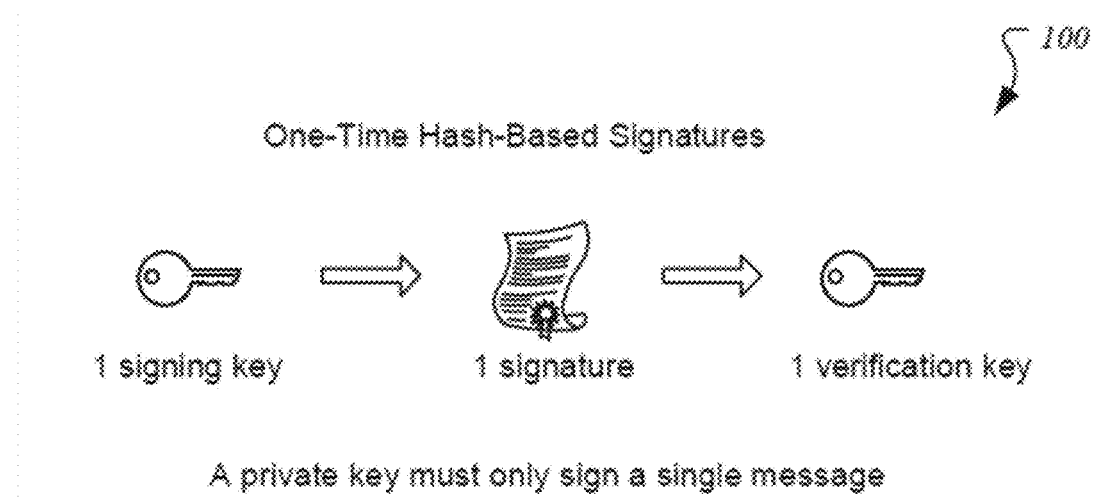
FIGS. 1A and 1B illustrate a one-time hash-based signatures scheme and a multi-time hash-based signatures scheme, respectively.

Embodiments described herein are directed to countermeasures for side-channel attacks on protected sign and key exchange operations, and in particular to protection of cryptographic operations (sign and key exchange) against timing, power, and EM side channel attacks.

ECDSA (Elliptic Curve Digital Signature Algorithm) Sign and ECDH (Elliptic Curve Diffie-Hellman) technologies apply elliptic curve scalar multiplication (ESM) to perform platform attestation and key exchange, utilizing the algebraic structure of elliptic curves over finite fields to provide highly secure operations. In ESM processing, a secret scalar value is applied in generation of output values.

However, execution of an elliptic curve scalar multiplication can leak information regarding the secret scalar value due to three root causes:

(a) Algorithmic Weakness Leakage due to unbalanced operations for processing secret bits 1 and 0, which can be exploited in a side channel attack);

(b) Data Dependent Vulnerabilities—Input data is correlated with power and EM side-channels, thus allowing detection of scalar values over multiple scans; and (c) Implementation Specific Leakages—In a particular hardware apparatus, the placement and routing inside of the silicon may differentiate power and EM signatures associated with accessing variables for processing secret bit 1 and 0, In some embodiments, an apparatus, system, or process includes one or more of technologies to mitigate the individual causes of scalar value leakage, the technologies including:

(a) Balanced Execution—Implementation of a Montgomery ladder operation to address algorithmic weakness in ESM operation;

(b) Point Randomization—a New Montgomery Ladder technology to address data dependent vulnerabilities; and (c) Scalar Splitting—Splitting of a scalar value using a random value to address implementation specific leakages.

In some embodiments, integration of such technologies results in an apparatus, system, or process enables a more robust ESM technique that can protect high-value assets utilizing ECDSA-based platform attestation and ECDH-based symmetric key generation against advanced physical (timing, power and electromagnetic) side-channel attacks.

Post-Quantum Cryptography

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Shor, P. W. "Algorithms for quantum computation: discrete logarithms and factoring". Proceedings 35th Annual Symposium on Foundations of Computer Science. IEEE Comput. Soc. Press. doi:10.1109/sfcs.1994.365700. ISBN 0818665807. Although any post-quantum cryptography could be built on the current cryptography, the novel approach would need to be intelligent, fast, and precise enough to resist and defeat any attacks by quantum computers.

Today's PQC is mostly focused on the following approaches: 1) hash-based cryptography based on Merkle's hash tree public-key signature system of 1979, which is built upon a one-message-signature idea of Lamport and Diffie; 2) code-based cryptography, such as McEliece's hidden-Goppa-code public-key encryption system; 3) lattice-based cryptography based on Hoffstein-Pipher-Silverman public-key-encryption system of 1998; 4) multivariate-quadratic equations cryptography based on Patarin's Hidden Field Equation (HFE) public-key-signature system of 1996 that is further based on the Matumoto-Imai proposal; 5) supersingular elliptical curve isogeny cryptography that relies on supersingular elliptic curves and supersingular isogeny graphs; and 6) symmetric key quantum resistance, such as HBS.

Figure 1B:
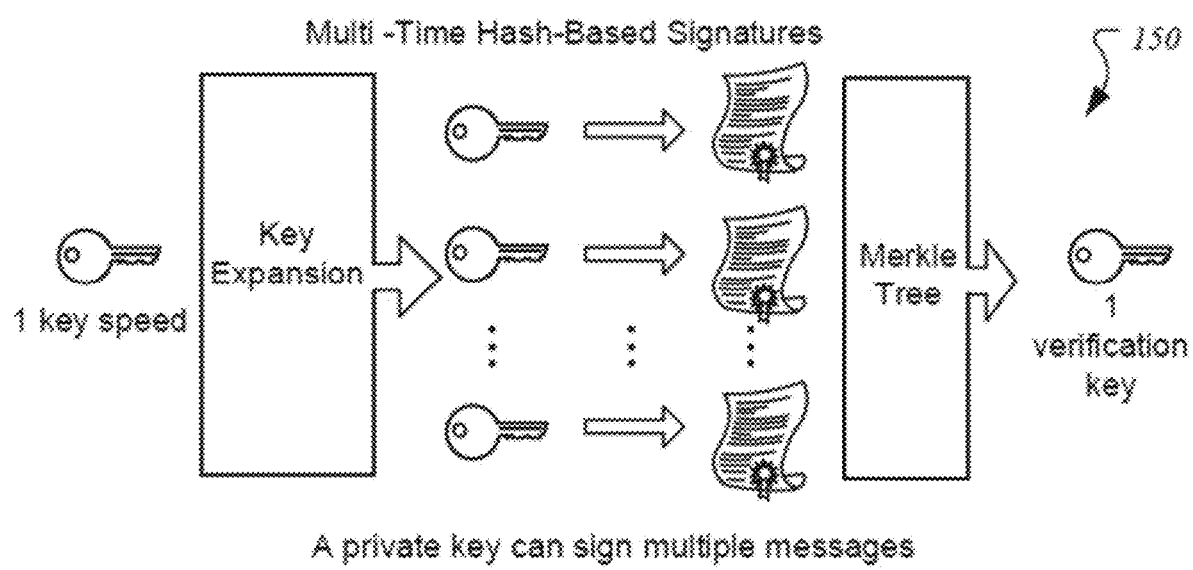

FIGS. 1A and 1B illustrate a one-time hash-based signatures scheme and a multi-time hash-based signatures scheme, respectively. As aforesaid, hash-based cryptography is based on cryptographic systems like Lamport signatures, Merkle Signatures, extended Merkle signature scheme (XMSS), SPHINCS scheme, SPHINCS+scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessary basic ingredients, such as relying on symmetric cryptography building blocks (e.g., hash functions), to counter the quantum counting and post-quantum computing challenges. HBS schemes are regarded as fast signature algorithms working with fast platform secured-boot, which is regarded as the most resistant to quantum attacks.

For example, as illustrated with respect to FIG. 1A, a scheme of HBS is shown that uses Merkle trees along with one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a private key can sign multiple messages.

Figure 2A:
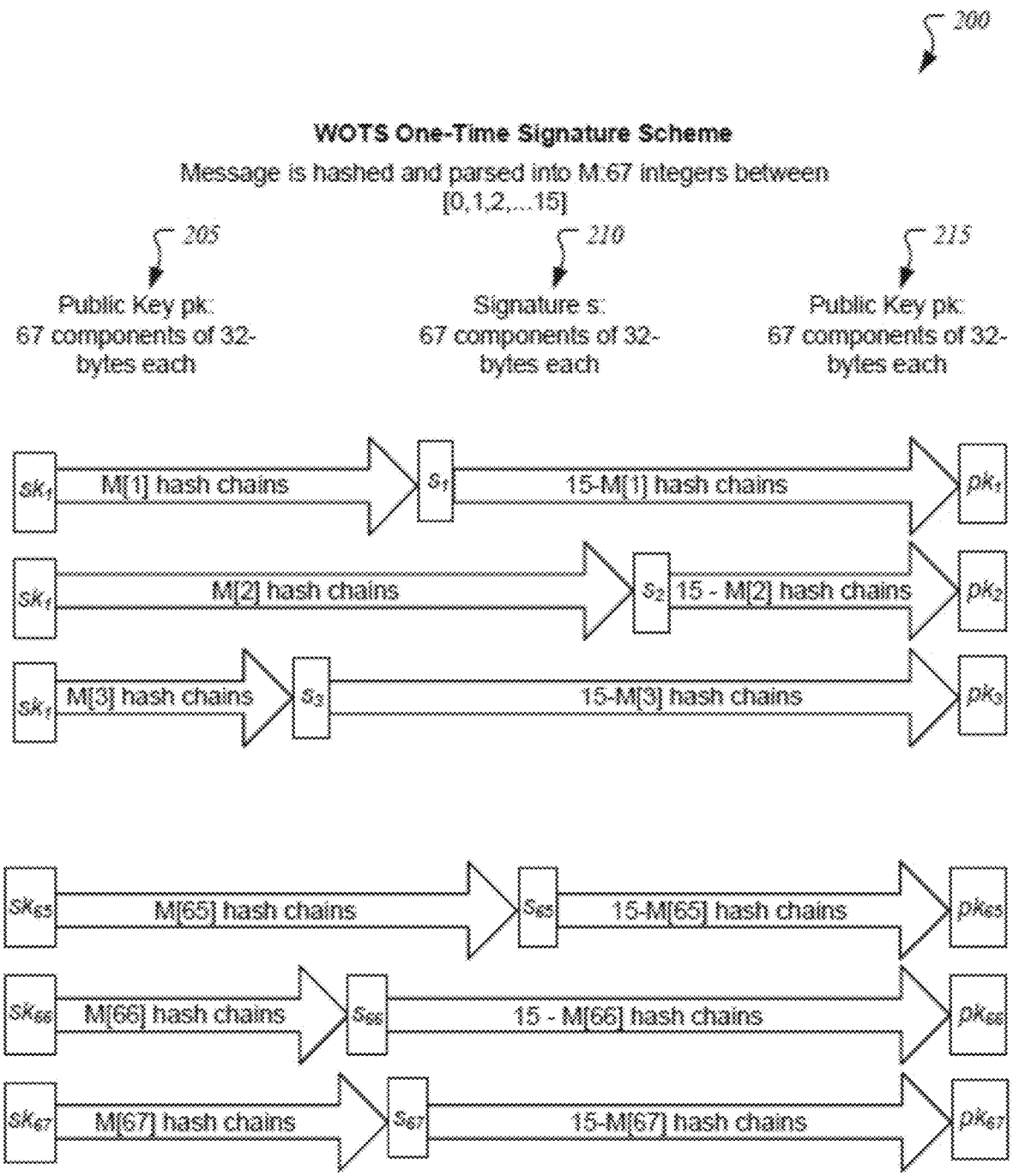
FIGS. 2A and 2B illustrate a one-time signature scheme and a multi-time signature scheme, respectively.
Figure 2B:
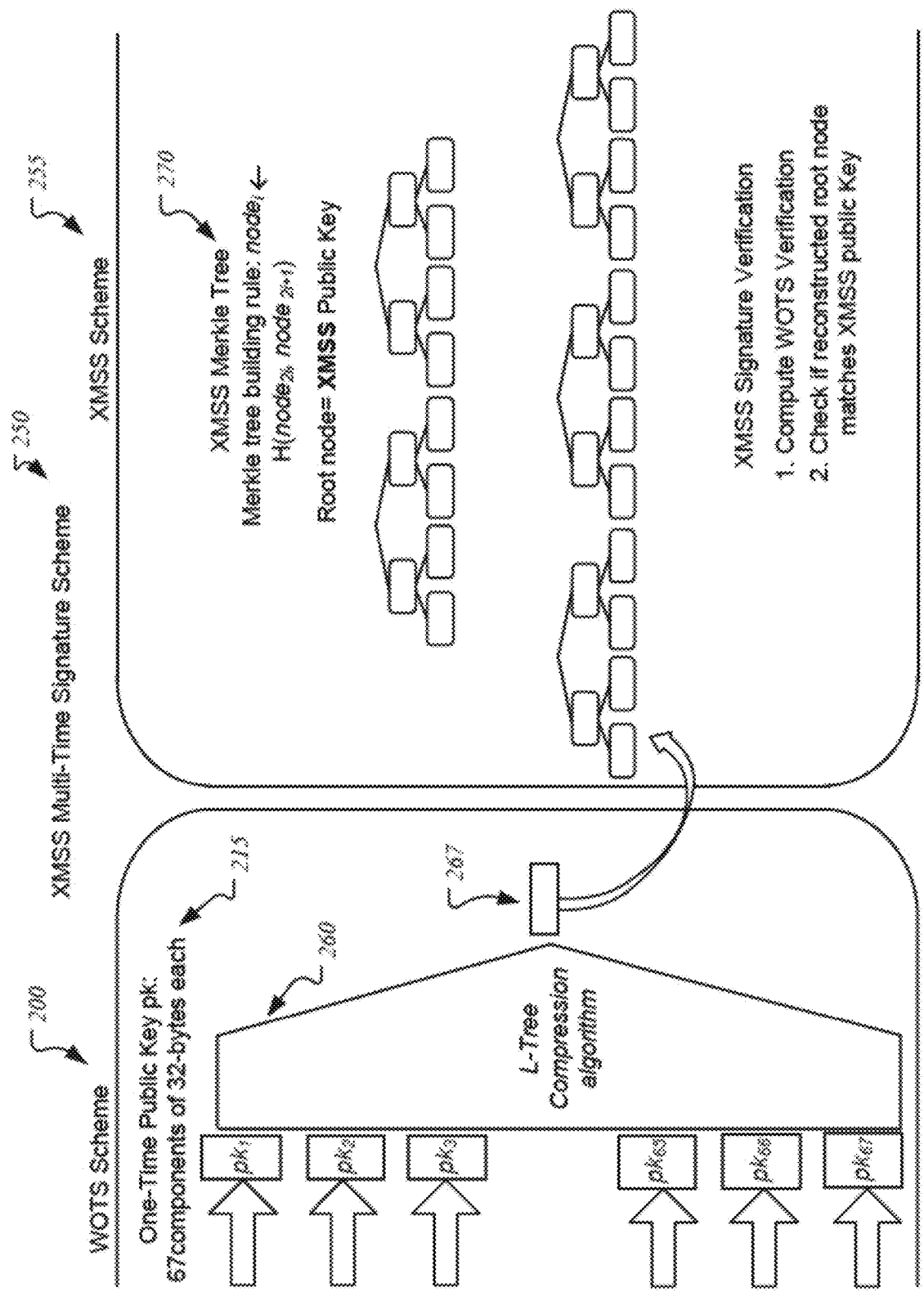

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS (WOTS) scheme 200, which was offered by Robert Winternitz of Stanford Mathematics Department, while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each.

Now, for example, FIG. 2B illustrates XMSS MTS scheme 250 that allows for a combination of WOTS scheme 200 of FIG. 2A and XMSS scheme 255 having XMSS Merkle tree 270. As discussed previously with respect to FIG. 2A, WOTS scheme 200 is based on a one-time public key, pk, 215, having 67 components of 32 bytes each, that is then put through L-Tree compression algorithm 260 to offer WOTS compressed pk 267 to take a place in the XMSS Merkle tree 270 of XMSS scheme 255. It is contemplated that XMSS signature verification may include computing WOTS verification and checking to determine whether a reconstructed root node matches the XMSS public key, such as root node=XMSS public key.

Figure 3:
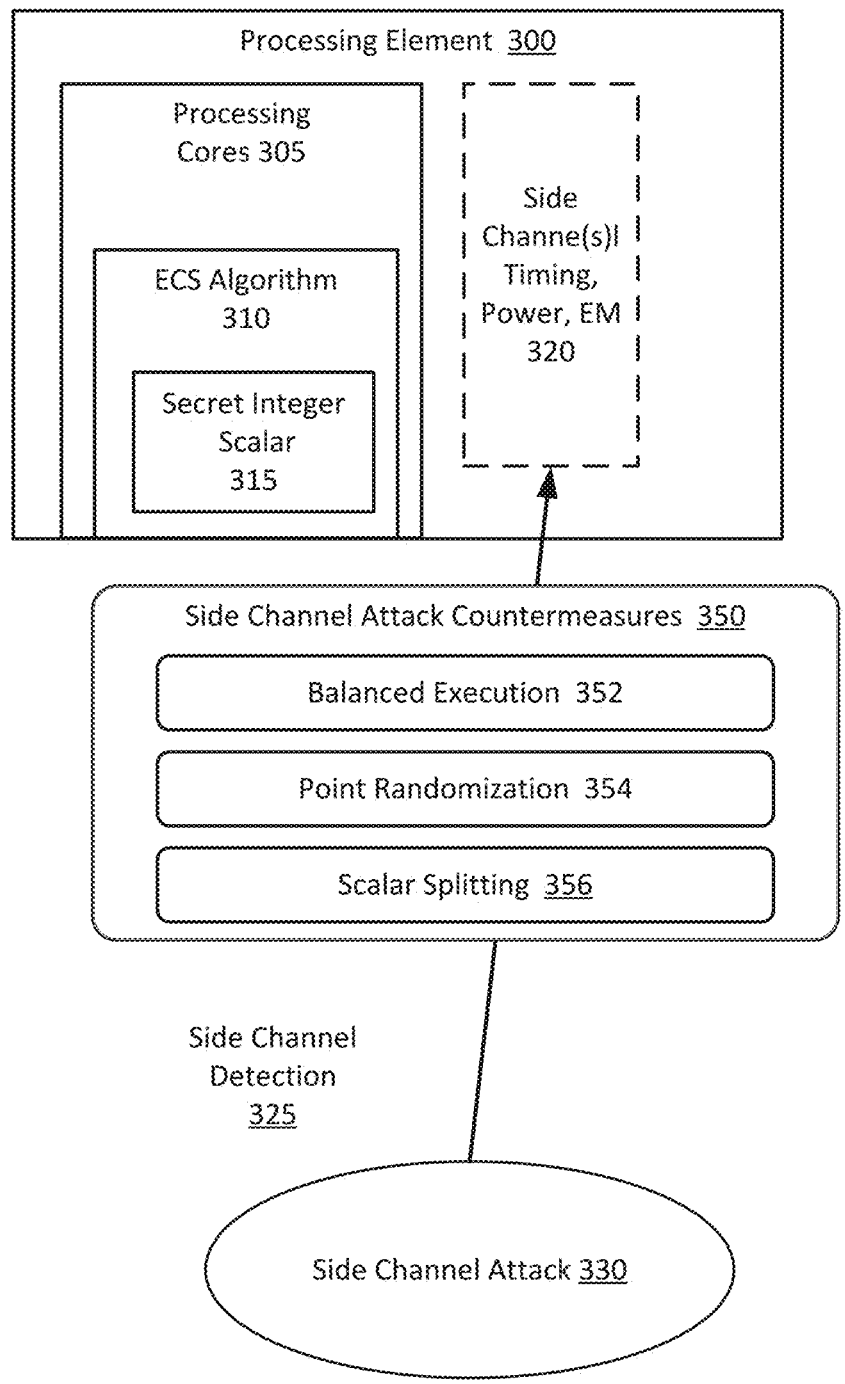
FIG. 3 is an illustration of an apparatus including a processing element to perform elliptic curve scalar multiplication, according to some embodiments.

Countermeasures for Hardware Side Channel Attacks on Protected Sign and Key Exchange Operations FIG. 3 is an illustration of an apparatus including a processing element to perform elliptic curve scalar multiplication, according to some embodiments. As illustrated, a processing element 300, such as a processor of the one or more processors 1102 illustrated in FIG. 11, includes one or more processing cores 305. The processing cores may include processing of one or more of ECDSA (Elliptic curve Diffie-Hellman) Sign and ECDH (Elliptic Curve Diffie-Hellman) operations for platform attestation and key exchange, including processing of an ECS (Elliptic Curve Scalar Multiplication) algorithm 310. ESM multiplication is the primary operation for both ECDSA and ECDH operations, and the processing of the ESM algorithm includes use of a secret integer scalar 315, as further illustrated in FIG. 4.

However, the operation of the processing element 300 may allow access to one or more side channels 320, wherein the side channels may include access to one or more of timing, power, or electromagnetic signals. This may be exploited in a side channel attack 330 utilizing certain forms of side channel detection 325. For example, the processing element 300 may include multiple tile elements, which may allow for an attacker to access signal or power links, include possible electromagnetic signals. An adversary can exploit ESM operation through the side-channels 330 to extract the secret integer scalar 315, thus enabling an attack on ECDSA Sign and ECDH operations.

In some embodiments, an apparatus, system, or process includes one or more side channel attack countermeasure technologies 350 to repel timing, power, and EM side channel attacks on the operation of the processing element, wherein the technologies include one or more of Balanced Execution 352, Point Randomization 354, and Scalar Splitting 356, as further described below.

Figure 4:
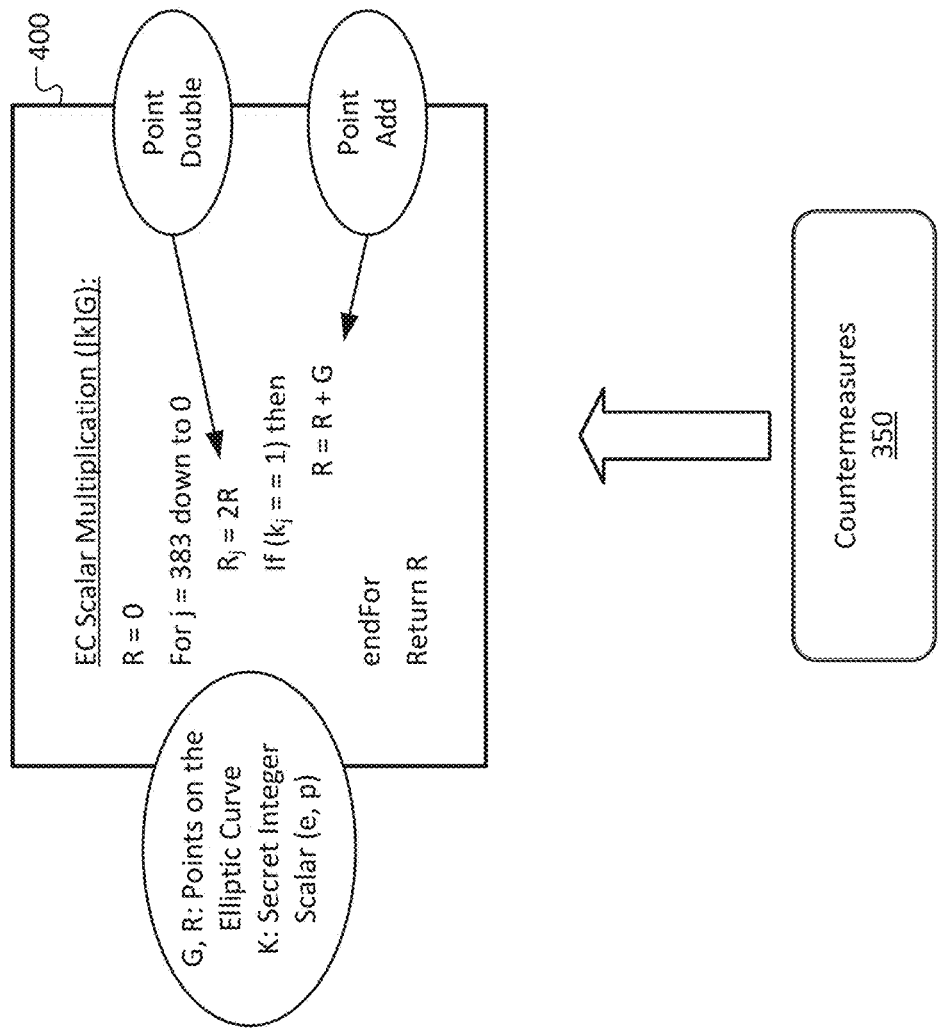
FIG. 4 is an illustration of aspects of a conventional elliptic curve multiplication algorithm that may be utilized in ECDSA Sign and ECDH operations.

FIG. 4 is an illustration of aspects of a conventional elliptic curve multiplication algorithm that may be utilized in ECDSA Sign and ECDH operations. The following is a conventional algorithm for executing elliptic curve scalar multiplication that is commonly represented by the notation [k]G, with k (e, p) representing a secret scalar value and G and R representing points on the elliptic curve:

| EC Scalar Multiplication ([k]G): |
| --- |
| R = 0<br>For j = 383 down to 0<br>   $R_j$ = 2R<br>   If ($k_j$ = = 1) then<br>      R = R + G<br>endFor<br>Return R |

As shown in FIG. 4, the algorithm 400 executes [k]G iteratively from a left most bit of k (most significant bit (MSB)) to a right most bit. Each iteration of the calculation consists of a Point Double operation and a conditional Point Add operation, wherein the addition operation occurs only when the relevant bit of the secret scalar value k equals 1.

In general the calculation of R cannot not be practically determined based on the output values. However, if an attacker can exploit side channel leakages, the attacker can determine the value of the secret integer scalar k, and thus potentially replicate the elliptic curve scalar multiplication in order to crack the platform attestation and key exchange in a system.

In some embodiments, as further described below, an apparatus, system, or process is to provide the one or more novel countermeasures 350, as illustrated in FIG. 3, relating to the ESM calculation to significantly reduce the likelihood of a successful side channel attack.

Figure 5:
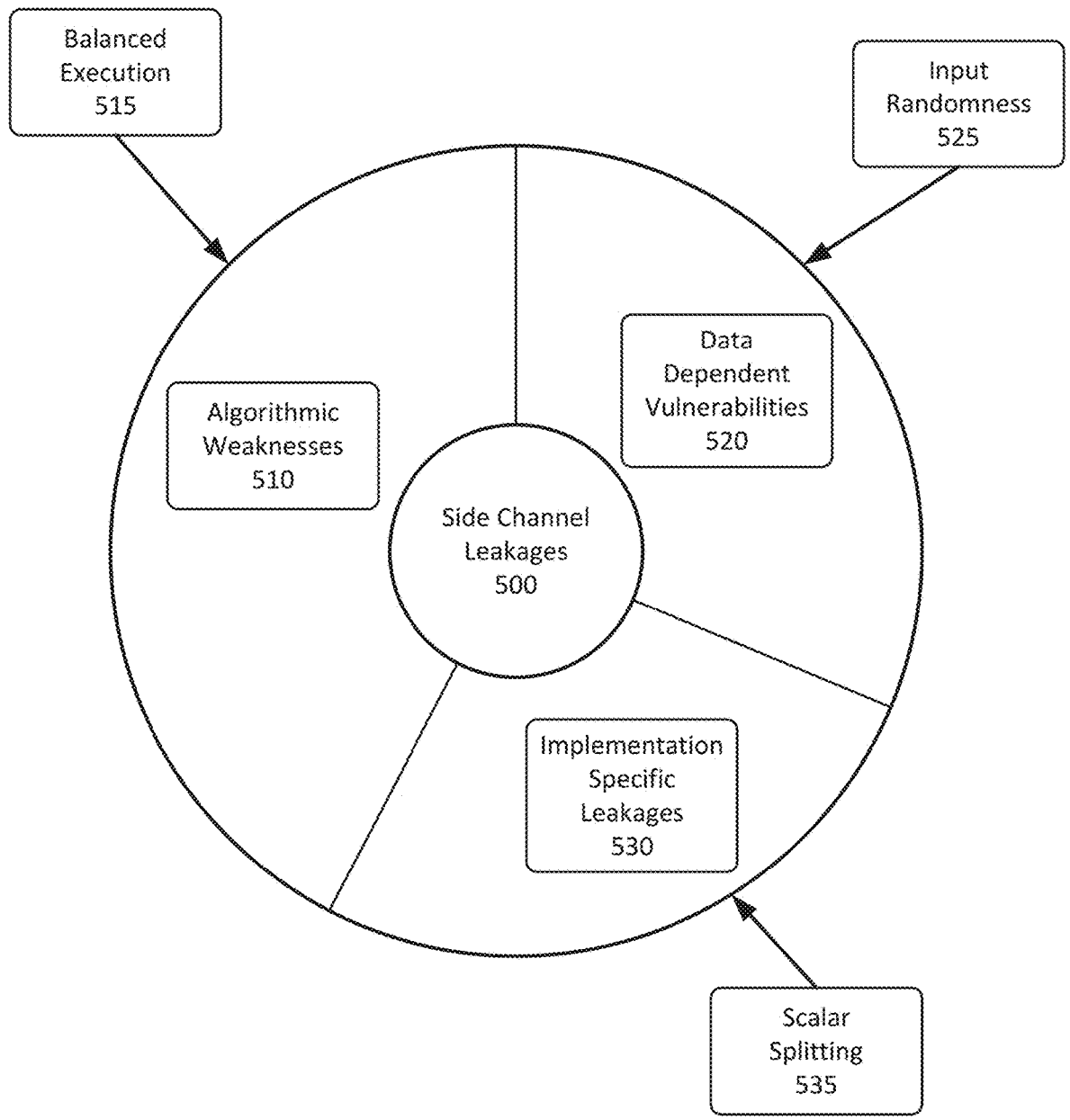
FIG. 5 is an illustration of side channel leakages and countermeasures for ESM calculation according to some embodiments.

FIG. 5 is an illustration of side channel leakages and countermeasures for ESM calculation according to some embodiments. As illustrated in FIG. 5, side channel leakages 500 in the operation of ESM calculation are derived from multiple sources, wherein the sources may include algorithmic weaknesses 510 (further illustrated in FIG. 6A), data dependent vulnerabilities 520 (further illustrated in FIG. 6B), and implementation specific leakages 530 (further illustrated in FIG. 6C).

Figure 8A:
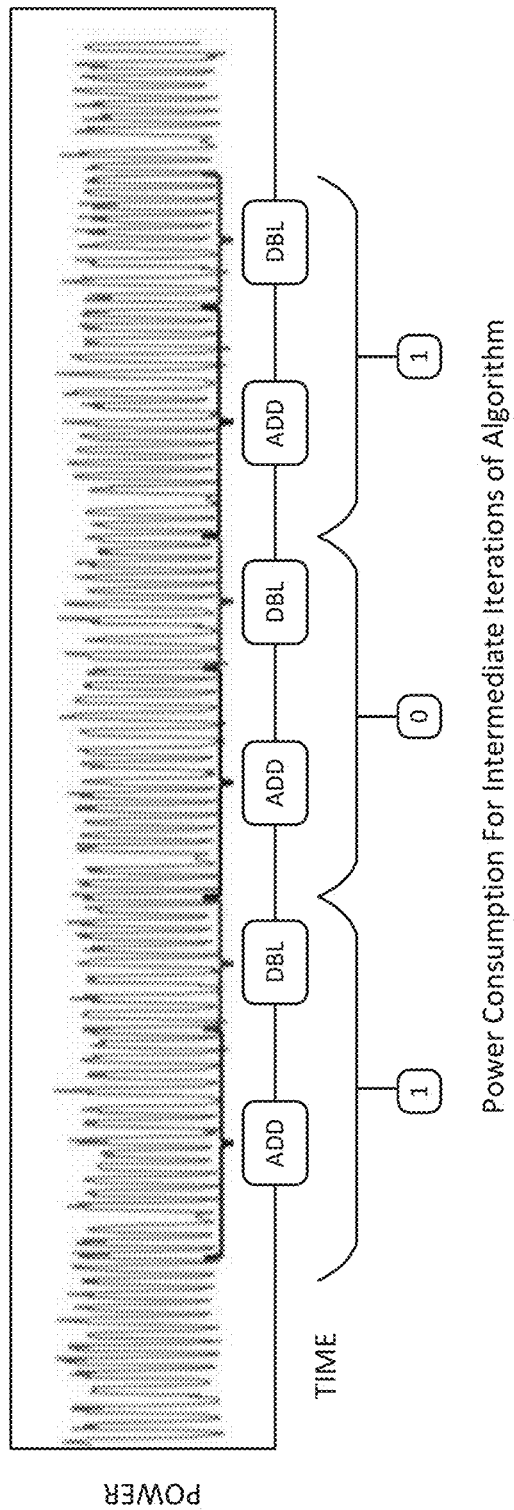
FIG. 8A is an illustration of balanced execution for elliptic curve scalar multiplication, according to some embodiments.
Figure 8B:
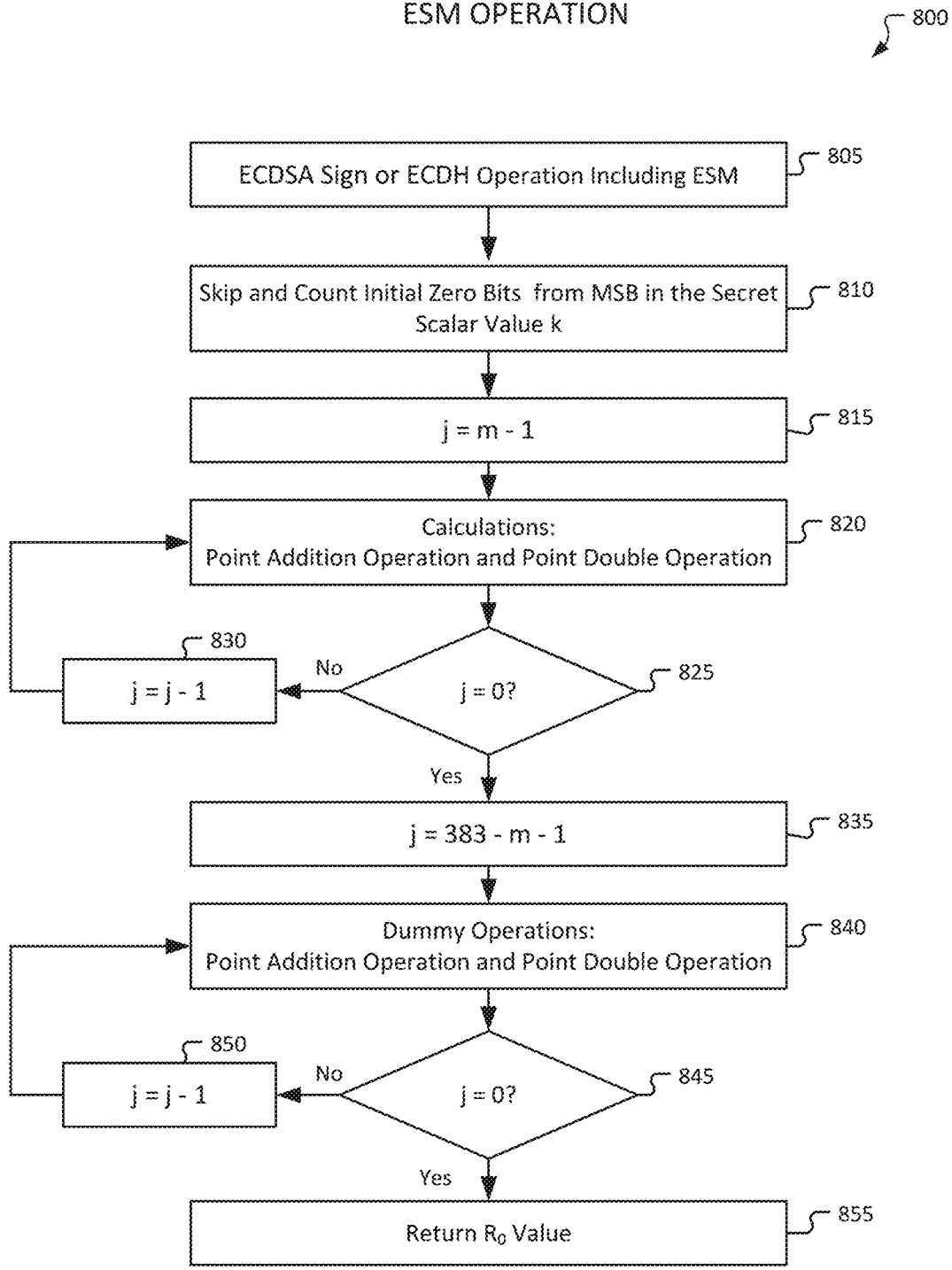
FIG. 8B is a flowchart to illustrate a process for balanced execution in elliptic curve scalar multiplication operation, according to some embodiments.
Figure 9A:
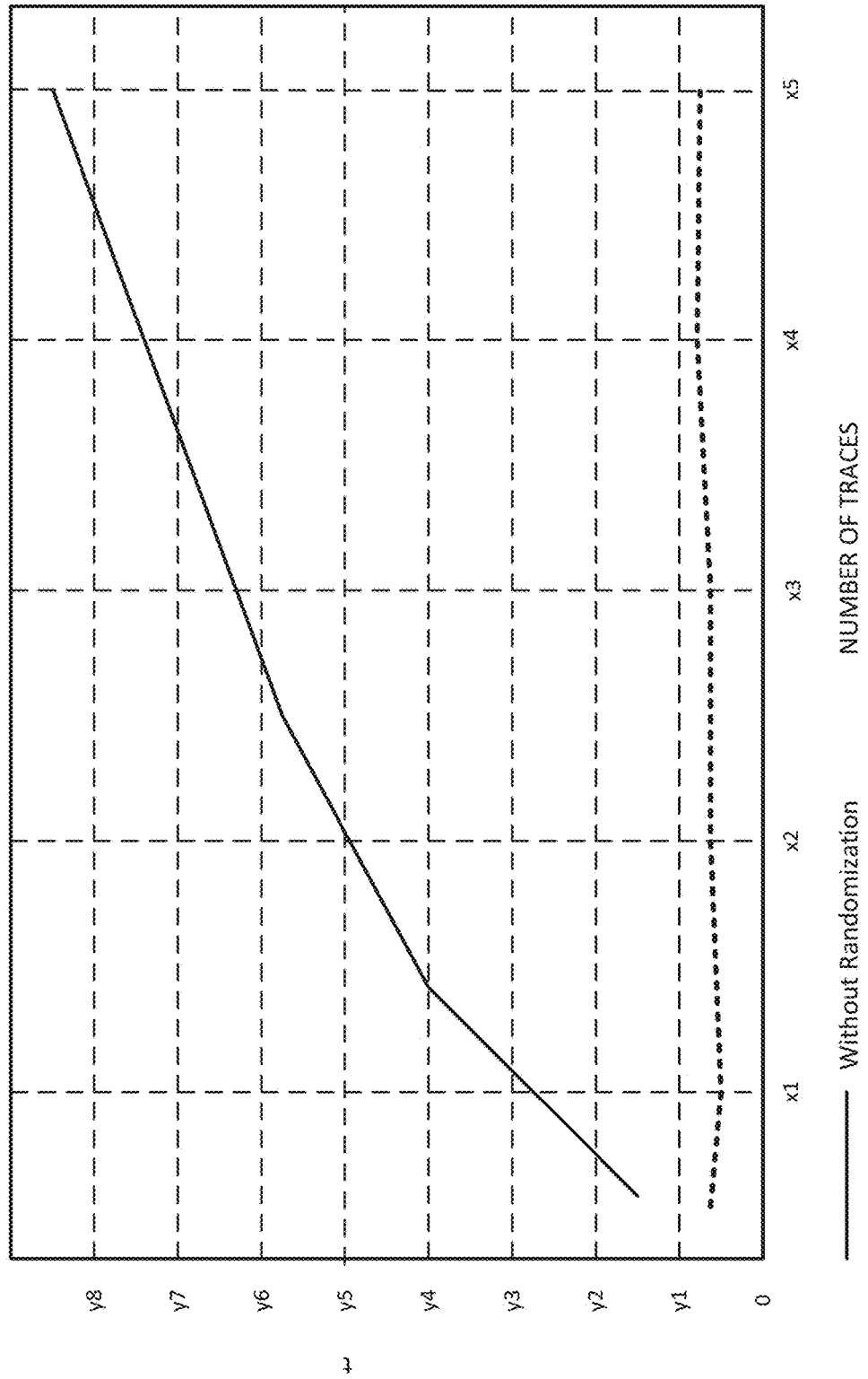
FIG. 9A is an illustration of data randomization to counter data dependent vulnerabilities in elliptic curve scalar multiplication, according to some embodiments.
Figure 9B:
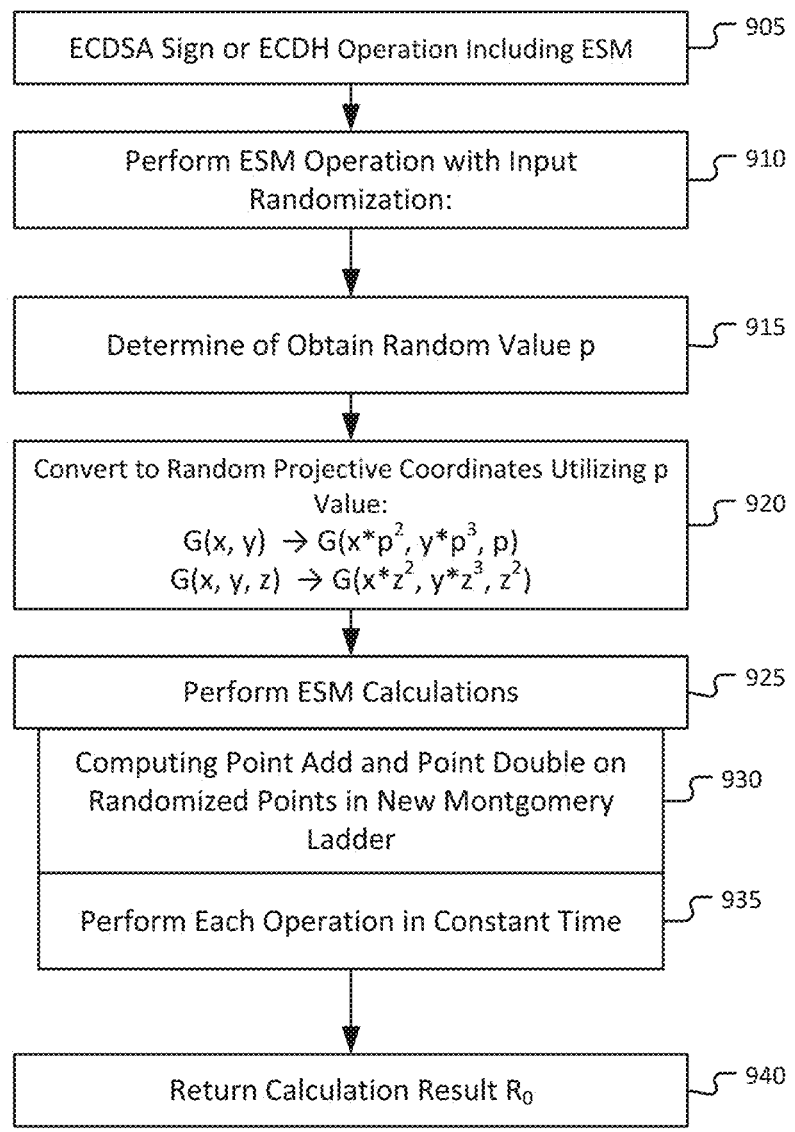
FIG. 9B is a flowchart to illustrate a process including data randomization to counter data dependent vulnerabilities in elliptic curve scalar multiplication, according to some embodiments.
Figure 10A:
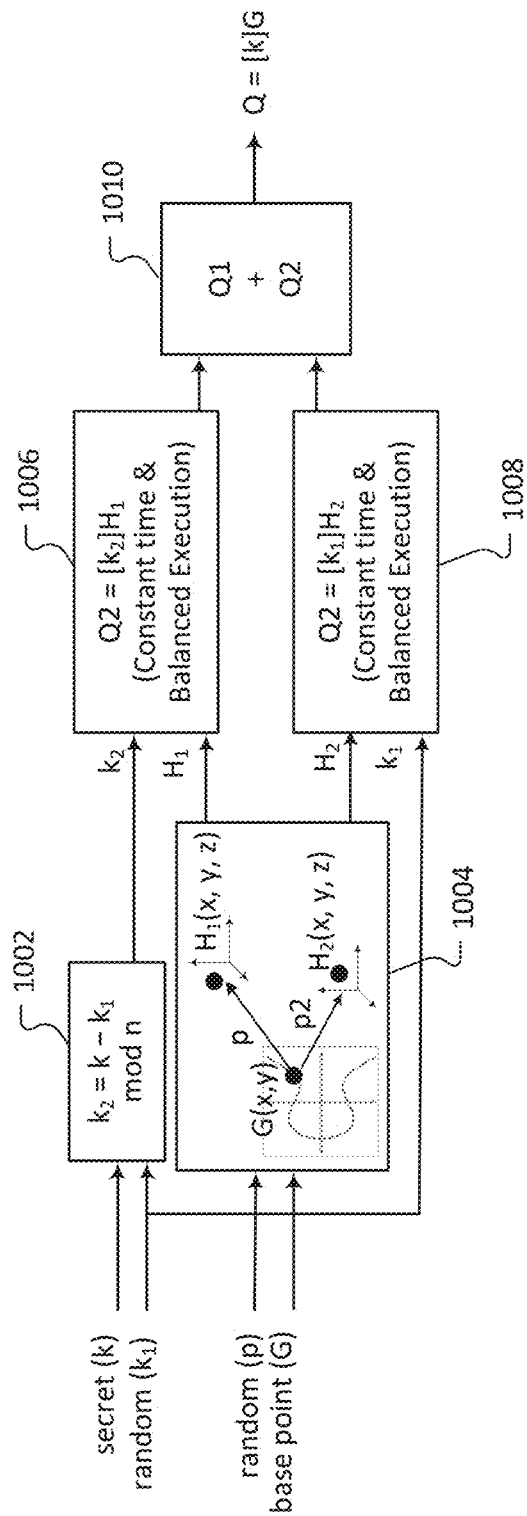
FIG. 10A is an illustration of scalar splitting to counter implementation specific leakages in elliptic curve scalar multiplication, according to some embodiments.
Figure 10B:
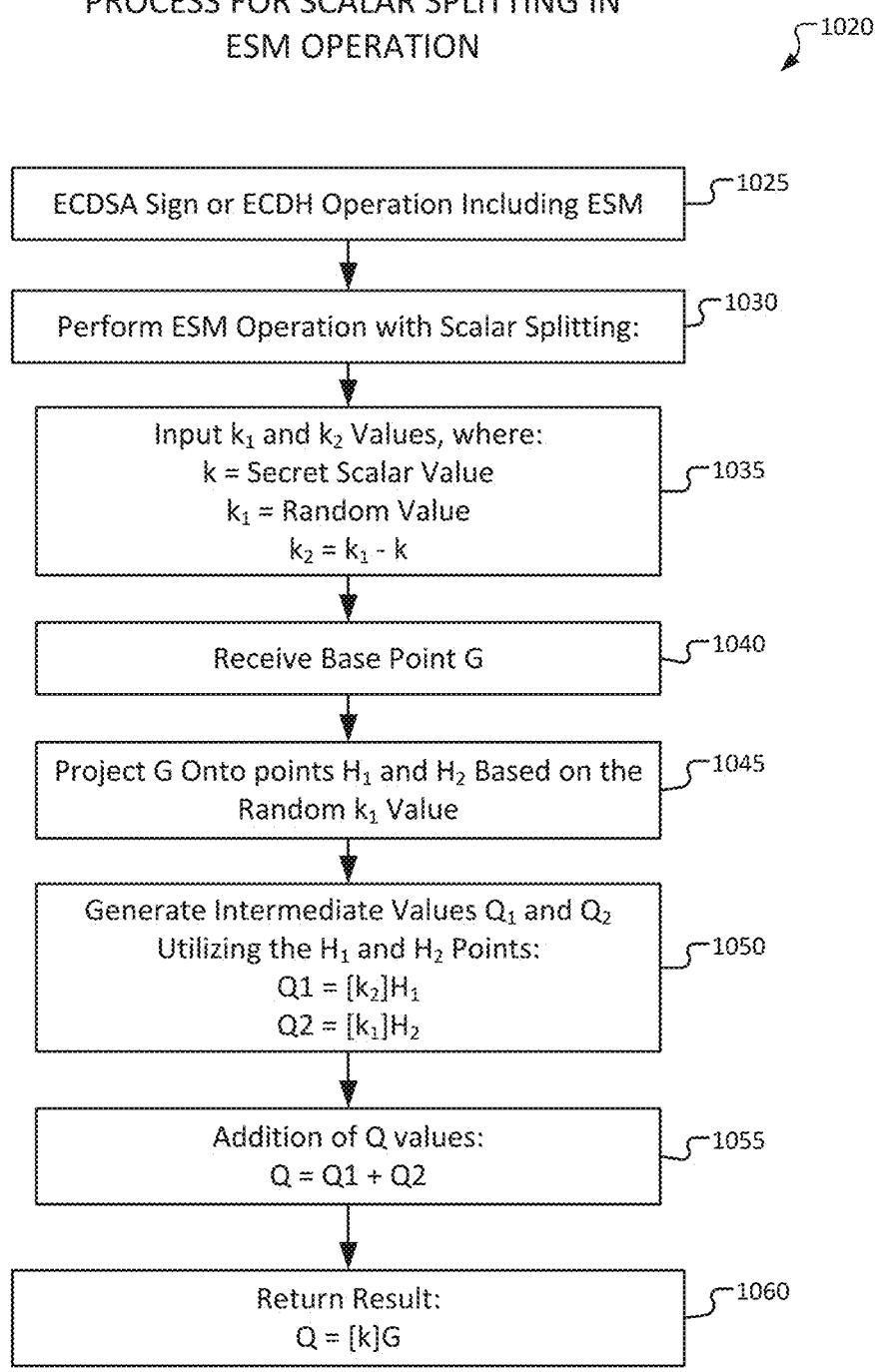
FIG. 10B is a flowchart to illustrate a process including scalar splitting to counter implementation specific leakages in elliptic curve scalar multiplication, according to some embodiments.

In some embodiments, an apparatus, system, or process is to provide countermeasures to address the sources of side channel leakages. The countermeasures may include one or more of balanced execution 515 of ESM calculation (as illustrated in FIGS. 8A, and 8B) to address algorithmic weaknesses 510; input randomness 525 in ESM calculation (as illustrated in FIGS. 9A and 9B) to address data dependent vulnerabilities 520; and scalar splitting 535 of ESM calculation (as illustrated in FIGS. 10A and 10B) to address implementation specific weaknesses 530.

Figure 6A:
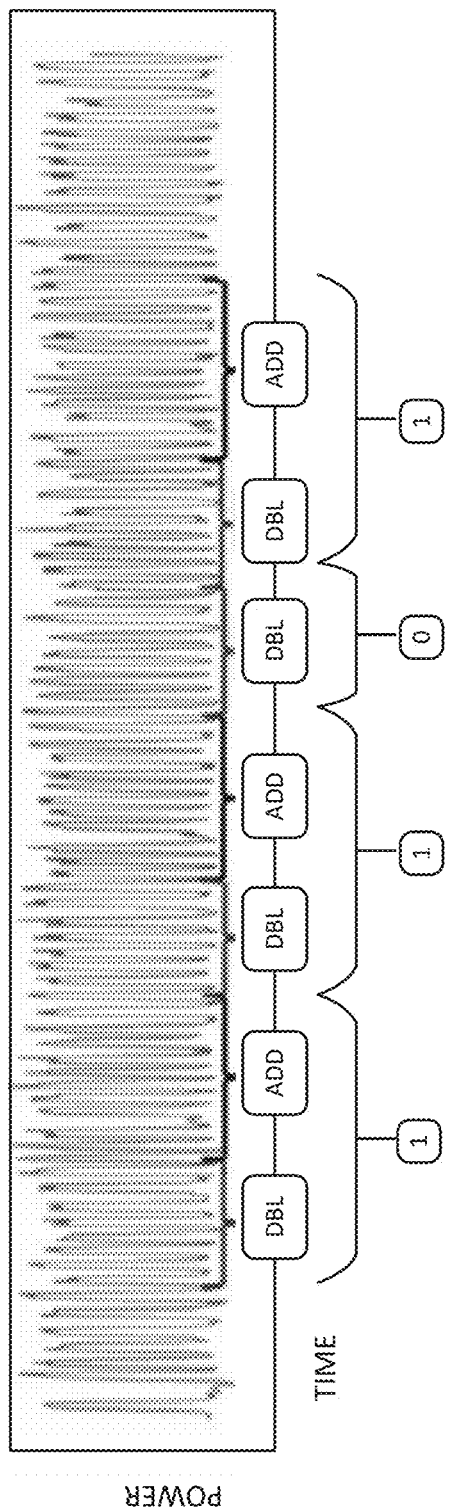
FIG. 6A-6D illustrate timing, power, and EM side channel leakages that may be addressed by embodiments of novel countermeasure technologies to repel side channel attacks.

FIG. 6A-6D illustrate timing, power, and EM side channel leakages that may be addressed by embodiments of novel countermeasure technologies to repel side channel attacks. FIG. 6A illustrates an algorithmic weakness in the ESM algorithm 400 illustrated in FIG. 4. The algorithm 400 executes [k]G iteratively from a left most bit of k to a right most bit. Each iteration consists of a Point Double operation and a conditional Point Add operation, wherein the addition operation will occur when the k value equals 1.

As illustrated in FIG. 6A, the nature of the ESM algorithm operation in providing a different calculation for operations in which the k bit value is 0 (a Point Double (DBL) operation) and in which the k bit value is 1 (a Point Double operation and a Point Add (ADD) operation), it is possible for an attacker to determine the entire k value utilizing a single power or EM measurement by detecting the differences between the signal produced by the calculation operation for k=1 value and the signal produced by the calculation operation for k=0 value. In this way, the attacker can potentially determine the full secret scalar value and utilize this to defeat the security of a system.

For example, FIG. 6A illustrates an operation in which certain bits of the k scalar are 1, 1, 0, 1. As shown, the differing power signatures over time for the DBL operation and the ADD operation may be applied to determine a pattern of DBL, ADD, DBL, ADD, DBL, DBL, ADD, which thus may reveal the 1, 1, 0, 1 bit values in one detection operation.

Figure 6B:
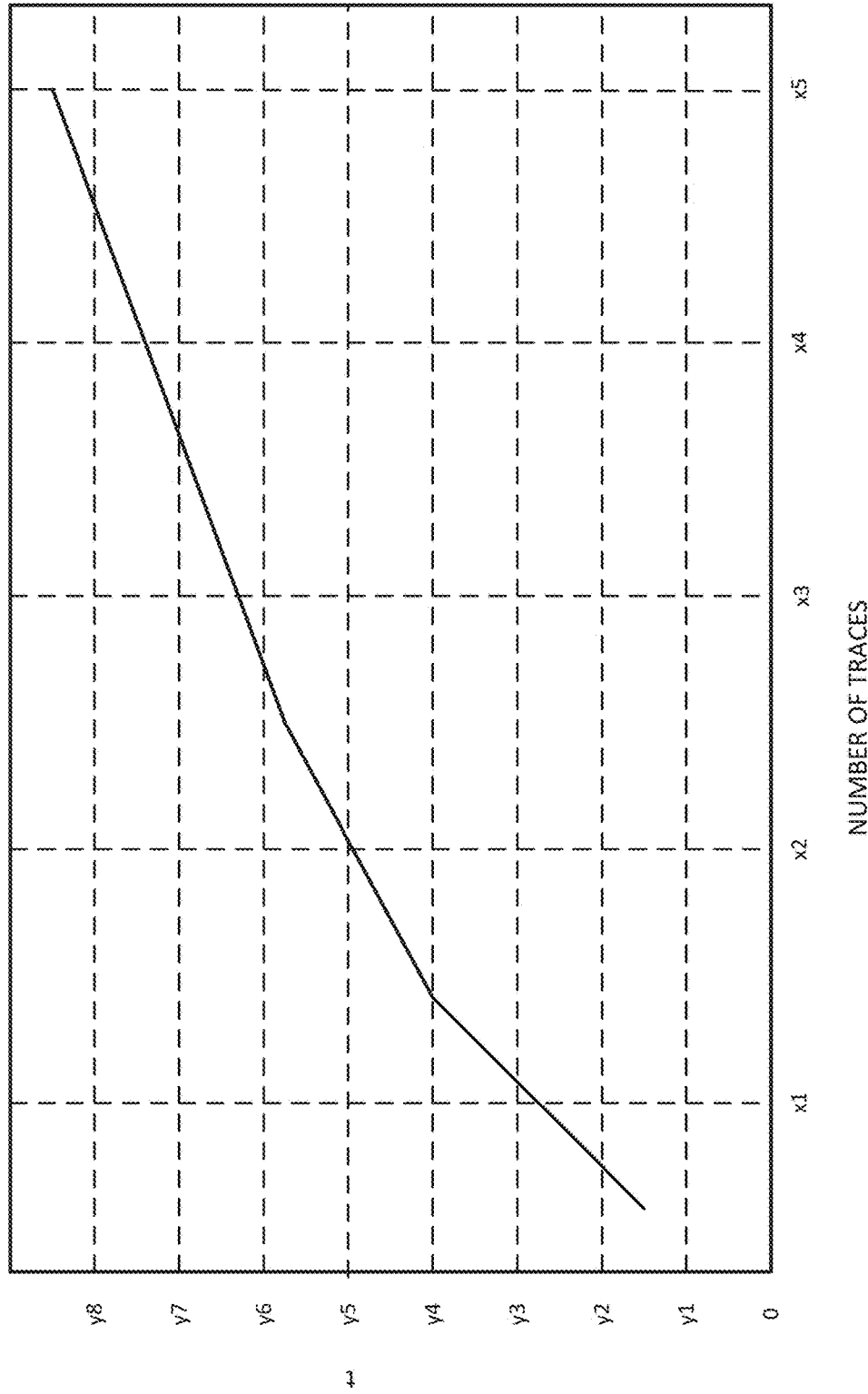

FIG. 6B illustrates data dependent vulnerabilities of the ESM operation. The power consumption and EM emanations from the underlying hardware of a processing unit are correlated with the input data G. However, these side-channel variations and the resulting leakages have smaller amplitude in comparison with the algorithmic weakness illustrated in FIG. 6A, and as a result are not exploitable through a single measurement. However, multiple measurements can potentially extract the entire k value through Differential Power/EM Analysis (DPA/DEMA) and Correlation Power/EM Analysis (CPA/CEMA), which thus can be utilized to establish a static key ECDH used for symmetric key generation.

For example, FIG. 6B illustrates the results of a statistical test to detect data dependent leakage, the illustrated graph providing the correlation t statistic versus a number of traces in a particular example. The increasing value of the t-statistic shows that an increasing amount of information can be extracted with additional traces, which may eventually be used to recover the secret scalar value if such traces can be performed by an attacker.

Figure 6C:
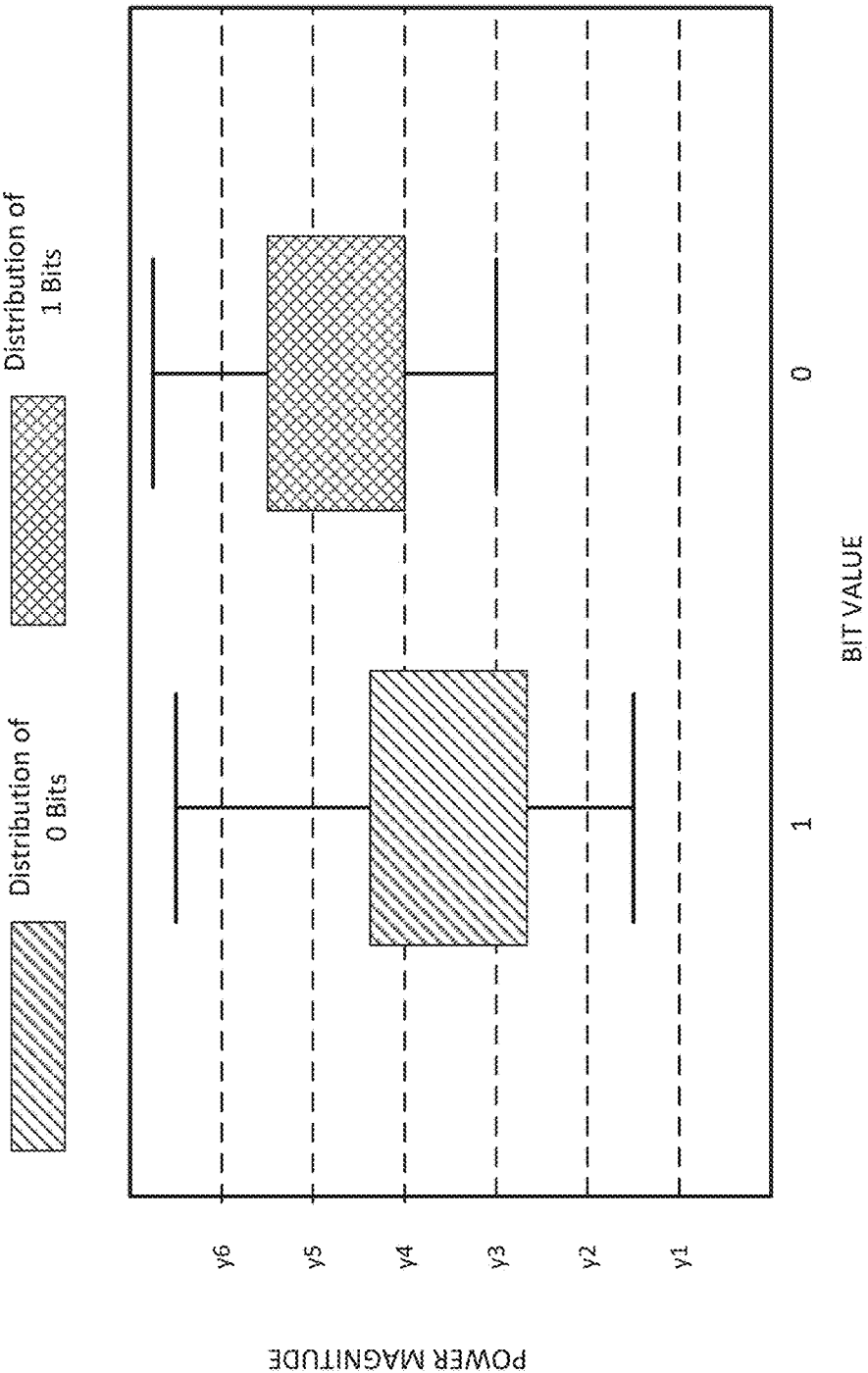

FIG. 6C illustrates implementation specific leakages in an ESM operation showing a distribution of power values across multiple scalars. There may be certain implementation differences in hardware that cause side-channel variations for processing a secret scalar bit 1 versus a scalar bit 0. For example, register placements, related routings, and fan-outs within the processor hardware may result in different power consumption and EM signatures depending on the particular scalar value.

In a particular implementation illustrated in FIG. 6C, the power magnitude associated with the generation of a bit with a value of 1 differs from the power magnitude associated with the generation of a bit with a value of 0. As illustrated in FIG. 6C, the precise value of the power magnitude for a particular instance will vary within a certain range for bit values of both 1 and 0 values and may overlap for certain measurements. Such implementation specific leakages will have a smaller amplitude in comparison with the algorithmic weakness illustrated in FIG. 6A, but these leakages may be exploitable through multiple measurements. The plot in FIG. 6C shows an exemplary experimental result in which power consumption at a specific time instant for processing a scalar bit 1 vs 0 forms two sets with an overlap. However, over a large number of traces the leakage of the 1 and 0 values provide patterns that may be utilized by an attacker to successfully determine the secret scalar value.

Figure 6D:

In an application of ESM calculation such as ECDSA Sign, if the attacker can identify a few bits of the secret scalar, then the attacker may gather a few bits of each of the multiple scalars to mount a lattice attack for discovering the signing key. In addition, if the attacker can measure the power/EM side-channels for a same scalar multiplication multiple times, by averaging these measurements the attacker may be able to reduce the noise level to extract the small implementation specific information leakages. FIG. 6D illustrates experimental data for finding one secret bit by gathering 10 measurements. In this example, the attacker can repeat the same analysis using the same measurements for finding other bits of the entire secret scalar.

Figure 7:
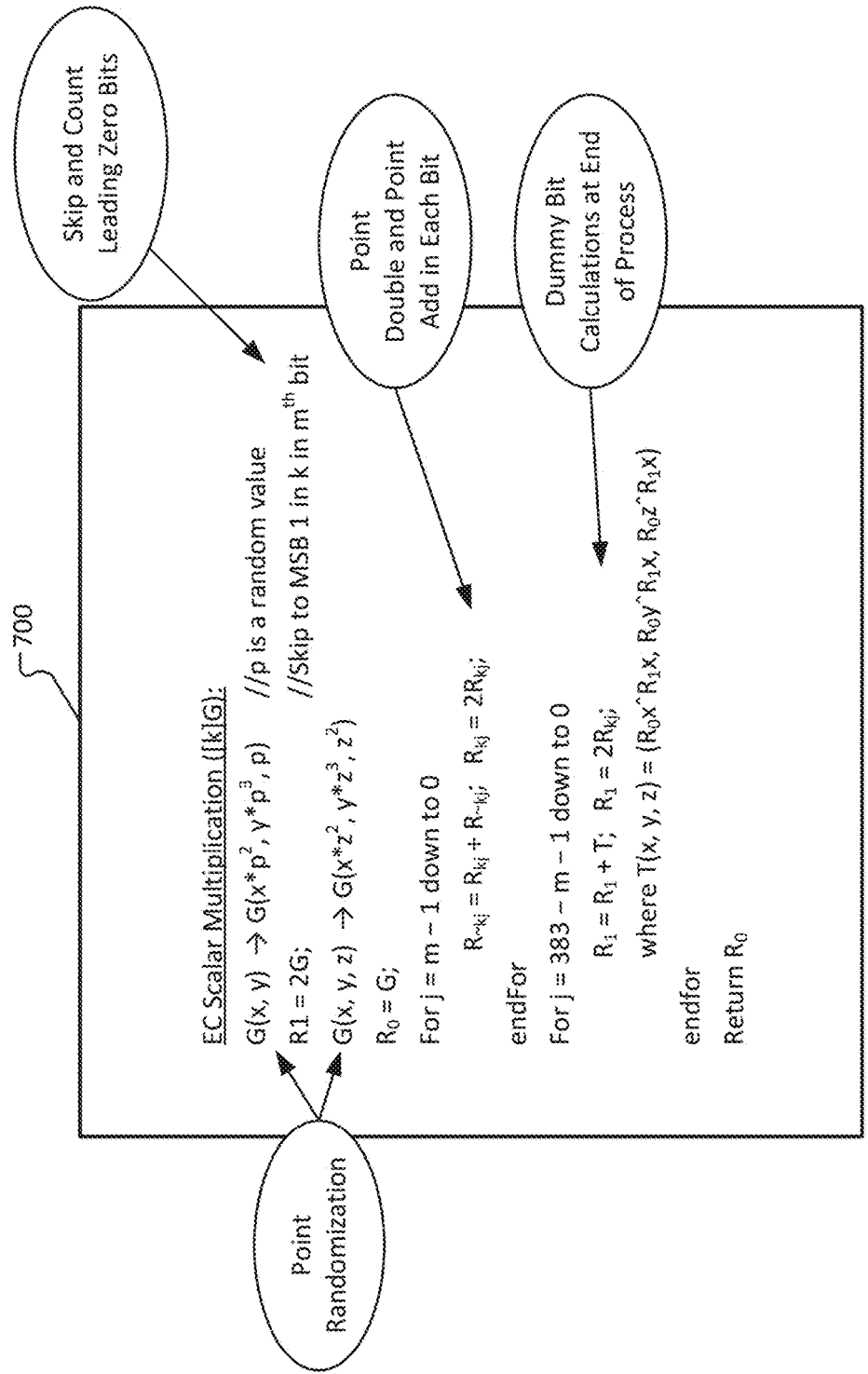
FIG. 7 is an illustration of an improved elliptic curve scalar multiplication algorithm that may be utilized in ECDSA Sign and ECDH operations, according to some embodiments.

FIG. 7 is an illustration of an improved elliptic curve scalar multiplication algorithm that may be utilized in ECDSA Sign and ECDH operations, according to some embodiments. In some embodiments, the algorithm includes a Montgomery ladder approach to improve protection against physical side channel attack. In a conventional Montgomery ladder approach, the point multiplication operations are to each be computed a fixed amount of time. This can be beneficial when timing or power consumption measurements are exposed to an attacker performing a side-channel attack.

In some embodiments, an improved algorithm provides for executing elliptic curve scalar multiplication includes a revised Montgomery Ladder operation. The improved algorithm may include the following:

---
EC Scalar Multiplication ([k]G):
---

$G(x, y) \rightarrow G(x \times p^2, y \times p^3, p)$ //p is a random value
$R1 = 2G;$ //Skip to MSB 1 in k in $m^{th}$ bit
$G(x, y, z) \rightarrow G(x \times z^2, y \times z^3, z^2)$
$R_0 = G;$
For j = m − 1 down to 0
  $R_{-kj} = R_{kj} + R_{-kj}; R_{kj} = 2R_{kj};$
endFor
For j = 383 − m − 1 down to 0
  $R_1 = R_1 + T; R_1 = 2R_{kj};$
  where $T(x, y, z) = (R_0 x \hat{} R_1 x, R_0 y \hat{} R_1 x, R_0 z \hat{} R_1 x)$
endfor
Return $R_0$

---

A conventional algorithm including a traditional Montgomery Ladder, such as illustrated in FIG. 4, protects intermediate bits of the scalar if the most significant bit of the scalar is 1. However, the secret scalars in most applications are generated randomly, and may consist of some number of zeros in the leading most significant bits. For such a scalar value, the traditional Montgomery Ladder executes the Point Double and Point Add with a special operand called Point-at-Infinity (0), which has a specific side-channel signature. An attacker may thus apply a single measurement to identify this signature, and then discover the leading zero bits.

In some embodiments, to protect against this vulnerability, an improved algorithm 700 provides for skipping and counting the leading zeros (if any) at the initial phases of the algorithm. The algorithm then proceeds with executing the same number of extra (dummy) iterations at the end of the process (as shown in FIG. 7). This provides protection of the entire scalar against single measurement-based attacks, as further illustrated in FIGS. 8A and 8B.

The algorithm 700 further includes point randomization in which the G values includes an additional random value of p. The introduction of value randomization may be utilized to prevent the detection of a leaked bit value over a number of traces, as further illustrated in FIGS. 9A and 9B.

In addition, the algorithm 700 may be implemented to include scalar splitting, the scalar introducing a new random input (k1) to provide security against implementation specific leakages, as further illustrated in FIGS. 10A and 10B.

FIG. 8A is an illustration of balanced execution for elliptic curve scalar multiplication, according to some embodiments. As shown in FIG. 8A, in implementing an improved ESM algorithm 700, as provided in FIG. 7, the scalar leakage provided by differing bit values is greatly reduced because for every bit value, 1 or 0, each point add operation is followed by a corresponding point double operation. In this manner, an embodiment of an apparatus, system, or process operates to prevent the identification of secret scalar bits through the observation a single side-channel measurement, as was illustrated in FIG. 6A.

In the particular example illustrated in FIG. 8A, certain intermediate scalar values ink may be 1, 0, 1. However, if the power signatures of the DBL and ADD operations are determined, the operations would be ADD, DBL, ADD, DBL, ADD, DBL, thus preventing an attacker from distinguishing between the 1 bit values and the 0 bit values in k.

FIG. 8B is a flowchart to illustrate a process for balanced execution in elliptic curve scalar multiplication operation, according to some embodiments. A process 800 includes ECDSA Sign or ECDH operation including ESM operation 805. The operation may provide processing utilizing the improved ESM algorithm 700 illustrated in FIG. 7. In some embodiments, the process includes skipping and counting initial zero bits from the most significant bit (MSB) 810. (In this example, the number of bits is 384, P-384 being the elliptic curve currently specified in NSA Suite B Cryptography for the ECDSA and ECDH algorithms. However, embodiments are not limited to any particular number of bits.) In this example operation, the $m^{th}$ bit is the most significant non-zero bit, and j is initially set to m−1 (815). The process then proceeds with the calculation of Point Addition and Point Double operations 820 for the bit, wherein the operations may be as provided in algorithm 700 of FIG. 7.

The process then proceeds with a determination whether j=0 (825). If not, then there are one or more additional bits for calculation, with j then decremented (j=j−1) 830, and the process proceeds with an additional iteration of the Point Addition and Point Double operations 820 for the next bit of k. Thus, the Point Addition and Point Double operations 820 are performed for each bit, regardless of value. When the determination indicates that j=0 (825), then the bits between the most significant non-zero bit and the final bit have been calculated.

In some embodiments, the process then proceeds with a set of zero or more iterations of dummy operations to represent the timing of the skipped zero bits at the beginning of the iterative calculations. In this process, j is then set to a value of 383−m−1 (835), and a Point Addition operation and a Point Double operation are performed for the bit 840, wherein the operations may be as provided in algorithm 700 of FIG. 7.

The process then proceeds with a determination whether a determination whether j=0 (845). If not, then there are one or more additional initial zero bits for calculation, with j then decremented (j=j−1) 850, and the proceeds with an additional iteration of the Point Addition and Point Double operations 840. When the determination indicates that j=0 (845), then dummy operations for the initial zero bits are completed, and the process proceeds with returning the Ro value 855.

FIG. 9A is an illustration of data randomization to counter data dependent vulnerabilities in elliptic curve scalar multiplication, according to some embodiments. As shown in FIG. 9A, in implementing an improved ESM algorithm 700, as provided in FIG. 7, data randomization is introduced. In some embodiments, an apparatus, system, or process is to convert the input point G to a Random Projective Coordinate and compute each Point Add and Point Double operation on different randomized points in the new Montgomery Ladder algorithm 700 as illustrated in FIG. 7.

The introduced data randomization operates to reduce or remove correlation between timing, power, and EM signals and the input data. In addition, each underlying operation is computed in constant time to ensure that the randomization technique not only protects against data dependent vulnerabilities but also does not create any additional timing side-channels.

FIG. 9A depicts experimental results for an embodiment where p is the parameter used in algorithm 700 in FIG. 7 to randomize the input point. The reduced t value curve with input randomization in comparison with the curve without randomization demonstrates that the embodiment operates to maintain the data protection as the number of traces available to the attacker is increased.

FIG. 9B is a flowchart to illustrate a process including data randomization to counter data dependent vulnerabilities in elliptic curve scalar multiplication, according to some embodiments. In some embodiments, a process 900 includes ECDSA Sign or ECDH operation including ESM calculation 905. The operation may provide processing utilizing the improved ESM algorithm 700 illustrated in FIG. 7 including a new Montgomery ladder operation providing for the performance of ESM calculation with input randomization 910.

In some embodiments, the process includes determining or obtaining a random value p (915), and converting G to a random projective coordinate utilizing the p value 920. The process then proceeds with the performance of the ESM calculations utilizing the improved ESM algorithm 925, wherein the calculation includes computing each Point Add and Point Double on different randomized points in the new Montgomery Ladder 930. In some embodiments, the process further includes performing each underlying operation in constant time 935, the performance in constant time ensures that the randomization technology not only protects against data dependent vulnerabilities but also prevents the creation of any additional timing side channels that could be exploited by an attacker. The operation then continues and returns the calculation result Ro 940.

FIG. 10A is an illustration of scalar splitting to counter implementation specific leakages in elliptic curve scalar multiplication, according to some embodiments. In a particular implementation of a processing element there may be certain implementation differences in the hardware that cause side-channel variations for processing a secret scalar bit 1 versus a scalar bit 0, such as register placements, related routings, and fan-outs within the processor, and these implementation details may result in different power consumption and EM signatures depending on the particular scalar value. In some embodiments, to prevent exploitation of the implementation specific leakages, an apparatus, system, or process is to provide scalar splitting in ESM calculation.

As shown in FIG. 10A, in implementing an improved ESM algorithm 700, as provided in FIG. 7, scalar splitting is based on a random value $k_1$ that is applied in conjunction with the secret scalar value k to provide additional protection against a side channel attack. As shown, a value $k_2$ is generated as the difference between the secret scalar k and the random value $k_1$ 1002. The G value is then projected to point locations $H_1$ and $H_2$ on the elliptic curve based on the $k_1$ value 1004.

In some embodiments, the randomized values are then utilized to generate a first intermediate Q1 value for $[k_2]H_1$ 1006 and a second intermediate Q2 value for $[k_1]H_2$ 1008, wherein each calculation may include constant time and balanced execution to prevent generation of side channel leakages. The Q1 and Q2 values are then added to generate a Q value 1010 that represents the [k]G output.

In some embodiments, through the application of the scalar splitting technology illustrated in FIG. 10A, an attacker is unable to obtain multiple traces of elliptic curve scalar multiplications with the same scalar because of the introduction of the random element in the splitting operation. This thus provides strong protection for both ECDSA Sign (in platform attestation) and ECDH (in key generation) against power and EM based side channel attacks. For ECDSA Sign, the scalar splitting operation isolates the attacker from gathering enough ephemera keys with a few known bits and further protects from the attacker mounting a lattice-based attack to recover a signing key. For ECDH, the scalar splitting operation prevents the attacker from collecting multiple measurements for the purpose of reducing noise by averaging the measurements in an attempt to identify the secret bits through correlation analysis.

FIG. 10B is a flowchart to illustrate a process including scalar splitting to counter implementation specific leakages in elliptic curve scalar multiplication, according to some embodiments. In some embodiments, a process 1020 provides ECDSA Sign or ECDH operation including ESM calculation 1025, the process including ESM operation with scalar splitting 1030.

In some embodiments, the scalar splitting operation includes inputting k and $k_1$ values, where k is the secret scalar value and $k_1$ is a random value, with $k_2$ being equal to $k_1$ minus k (1035). Base point G is received 1040. and G is projected onto multiple points $H_1$ and $H_2$ based on the random $k_1$ value 1045. Utilizing the projected values $H_1$ and $H_2$ the process then proceeds with generation of intermediate values $Q_1$ and $Q_2$ utilizing the $H_1$ and $H_2$ points 1050, where:

$$Q_1=[k_2]H_1$$

$$Q_2=[k_1]H_2$$

The resulting $Q_1$ and $Q_2$ values are then added to generate Q 1055, the result is returned, where Q=[k]G 1060.

Figure 11:
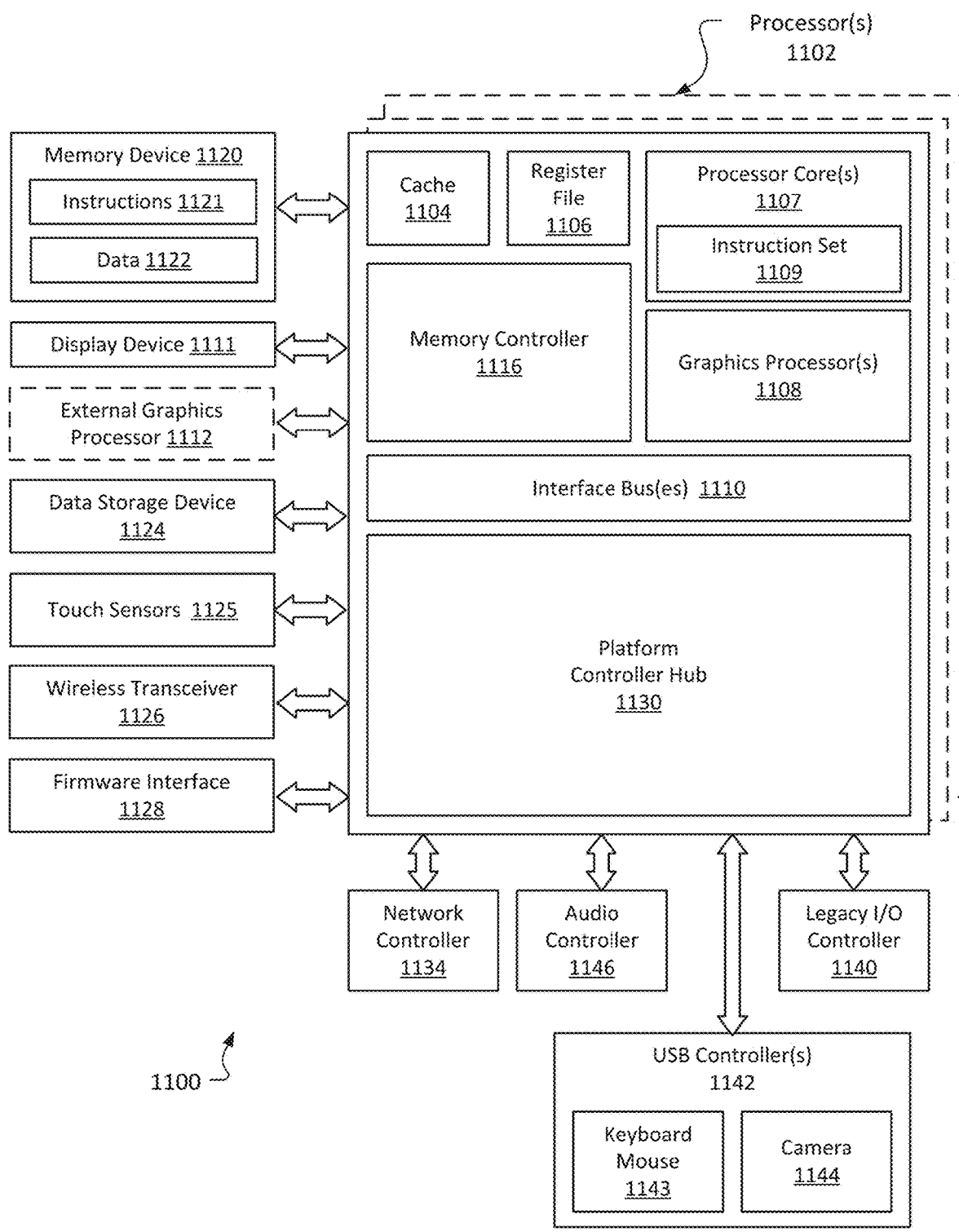
FIG. 11 illustrates an embodiment of an exemplary computing architecture for implementing countermeasures for side-channel attacks on protected sign and key exchange operations, according to some embodiments.

FIG. 11 illustrates an embodiment of an exemplary computing architecture for implementing countermeasures for side-channel attacks on protected sign and key exchange operations, according to some embodiments. In various embodiments as described above, a computing architecture 1100 may comprise or be implemented as part of an electronic device. In some embodiments, the computing architecture 1100 may be representative, for example, of a computer system that implements one or more components of the operating environments described above. In some embodiments, computing architecture 1100 may be representative of one or more portions or components of a Deep Neural Network (DNN) training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100. In some embodiments, the computing elements are to provide for countermeasures for side-channel attacks on protected sign and key exchange operations, and in particular to protection of cryptographic operations (sign and key exchange) against timing, power, and EM side channel attacks.

As shown in FIG. 11, the computing architecture 1100 includes one or more processors 1102 and one or more graphics processors 1108, and may be a single processor desktop system, a multiprocessor workstation system, or a server system having a large number of processors 1102 or processor cores 1107. In one embodiment, the system 1100 is a processing platform incorporated within a system-on-a-chip (SoC or SOC) integrated circuit for use in mobile, handheld, or embedded devices.

An embodiment of system 1100 can include, or be incorporated within, a server-based gaming platform, a game console, including a game and media console, a mobile gaming console, a handheld game console, or an online game console. In some embodiments system 1100 is a mobile phone, smart phone, tablet computing device or mobile Internet device. Data processing system 1100 can also include, couple with, or be integrated within a wearable device, such as a smart watch wearable device, smart eyewear device, augmented reality device, or virtual reality device. In some embodiments, data processing system 1100 is a television or set top box device having one or more processors 1102 and a graphical interface generated by one or more graphics processors 1108.

In some embodiments, the one or more processors 1102 each include one or more processor cores 1107 to process instructions which, when executed, perform operations for system and user software. In some embodiments, each of the one or more processor cores 1107 is configured to process a specific instruction set 1109. In some embodiments, instruction set 1109 may facilitate Complex Instruction Set Computing (CISC), Reduced Instruction Set Computing (RISC), or computing via a Very Long Instruction Word (VLIW). Multiple processor cores 1107 may each process a different instruction set 1109, which may include instructions to facilitate the emulation of other instruction sets. Processor core 1107 may also include other processing devices, such as a Digital Signal Processor (DSP).

In some embodiments, the processor 1102 includes cache memory 1104. Depending on the architecture, the processor 1102 can have a single internal cache or multiple levels of internal cache. In some embodiments, the cache memory 1104 is shared among various components of the processor 1102. In some embodiments, the processor 1102 also uses an external cache (e.g., a Level-3 (L3) cache or Last Level Cache (LLC)) (not shown), which may be shared among processor cores 1107 using known cache coherency techniques. A register file 1106 is additionally included in processor 1102 which may include different types of registers for storing different types of data (e.g., integer registers, floating point registers, status registers, and an instruction pointer register). Some registers may be general-purpose registers, while other registers may be specific to the design of the processor 1102.

In some embodiments, one or more processor(s) 1102 are coupled with one or more interface bus(es) 1110 to transmit communication signals such as address, data, or control signals between processor 1102 and other components in the system. The interface bus 1110, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 1102 include an integrated memory controller 1116 and a platform controller hub 1130. The memory controller 1116 facilitates communication between a memory device and other components of the system 1100, while the platform controller hub (PCH) 1130 provides connections to I/O devices via a local I/O bus.

Memory device 1120 can be a dynamic random-access memory (DRAM) device, a static random-access memory (SRAM) device, flash memory device, phase-change memory device, or some other memory device having suitable performance to serve as process memory. In one embodiment the memory device 1120 can operate as system memory for the system 1100, to store data 1122 and instructions 1121 for use when the one or more processors 1102 execute an application or process. Memory controller hub 1116 also couples with an optional external graphics processor 1112, which may communicate with the one or more graphics processors 1108 in processors 1102 to perform graphics and media operations. In some embodiments a display device 1111 can connect to the processor(s) 1102. The display device 1111 can be one or more of an internal display device, as in a mobile electronic device or a laptop device, or an external display device attached via a display interface (e.g., DisplayPort, etc.). In one embodiment the display device 1111 can be a head mounted display (HMD) such as a stereoscopic display device for use in virtual reality (VR) applications or augmented reality (AR) applications.

In some embodiments the platform controller hub 1130 enables peripherals to connect to memory device 1120 and processor 1102 via a high-speed I/O bus. The I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). The data storage device 1124 can connect via a storage interface (e.g., SATA) or via a peripheral bus, such as a Peripheral Component Interconnect bus (e.g., PCI, PCI Express). The touch sensors 1125 can include touch screen sensors, pressure sensors, or fingerprint sensors. The wireless transceiver 1126 can be a Wi-Fi transceiver, a Bluetooth transceiver, or a mobile network transceiver such as a 3G, 4G, Long Term Evolution (LTE), or 5G transceiver. The firmware interface 1128 enables communication with system firmware, and can be, for example, a unified extensible firmware interface (UEFI). The network controller 1134 can enable a network connection to a wired network. In some embodiments, a high-performance network controller (not shown) couples with the interface bus 1110. The audio controller 1146, in one embodiment, is a multi-channel high definition audio controller. In one embodiment the system 1100 includes an optional legacy I/O controller 1140 for coupling legacy (e.g., Personal System 2 (PS/2)) devices to the system. The platform controller hub 1130 can also connect to one or more Universal Serial Bus (USB) controllers 1142 connect input devices, such as keyboard and mouse 1143 combinations, a camera 1144, or other USB input devices.

In some embodiments, one or more non-transitory computer-readable storage mediums having stored thereon executable computer program instructions that, when executed by one or more processors, cause the one or more processors to perform operations including: commencing a process including an elliptic curve scalar multiplication (ESM) operation, the operation including application of a secret scalar value; counting a number of leading '0' bits in the secret scalar value; skipping the number of leading '0' bits in the secret scalar value for processing; performing an ESM iteration for each bit of the secret scalar value beginning with a most significant '1' bit of the secret scalar value, wherein the performance of the ESM iteration includes a Point Addition operation and a Point Double operation for each bit of the secret scalar value; performing an ESM operation for each of a number of dummy operations, the number of dummy operations being equal to the number of leading '0' bits in the secret scalar value; and returning an output result for the ESM operation.

In some embodiments, the one or more storage mediums further include instructions for converting an input value for the ESM operation to random projective coordinates using a random value; and generating randomized points based on the random projective coordinates.

In some embodiments, the one or more storage mediums further include instructions for performing the Point Addition operation and the Point Double operation on the randomized points.

In some embodiments, the one or more storage mediums further include instructions for performing each operation in the ESM operation in constant time.

In some embodiments, the one or more storage mediums further include instructions for splitting the secret scalar value into a first scalar value and a second scalar value based on a random value.

In some embodiments, the one or more storage mediums further include instructions for projecting an input value to multiple points based on the random value; generating an intermediate value based on each of the multiple points; and adding the intermediate values to generate the output result.

In some embodiments, the process includes one or more of platform attestation or key exchange.

In some embodiments, the process includes one or more of an ECDSA (Elliptic Curve Digital Signature Algorithm) Sign operation; or an ECDH (Elliptic Curve Diffie-Hellman) operation.

In some embodiments, a system includes one or more processors including one or more processing cores, the one or more processor to perform one or more secure operations utilizing elliptic curve scalar multiplication (ESM); and a memory for storage of data, including data for one or more secure operations, wherein the one or more processors include a capability to provide one or more countermeasures to hardware side channel attacks on ESM processing, the one or more processors to: perform an elliptic curve scalar multiplication (ESM) operation, the operation including application of a secret scalar value; count a number of leading '0' bits in the secret scalar value; skip the number of leading '0' bits in the secret scalar value for processing; perform an ESM iteration for each bit of the secret scalar value beginning with a most significant '1' bit of the secret scalar value, wherein the performance of the ESM operation includes a Point Addition operation and a Point Double operation for each bit of the secret scalar value; perform an ESM iteration for a number of dummy operations, the number of dummy iterations being equal to the number of leading '0' bits in the secret scalar value; and return an output result for the ESM operation.

In some embodiments, the one or more processors are further to: convert an input value for the ESM operation to random projective coordinates using a random value; and generate randomized points based on the random projective coordinates.

In some embodiments, the one or more processors are further to: perform the Point Addition operation and the Point Double operation on the randomized points.

In some embodiments, the one or more processors are to perform each operation in the ESM operation in constant time.

In some embodiments, the one or more processors are further to: split the secret scalar value into a first scalar value and a second scalar value based on a random value.

In some embodiments, the one or more processors are further to: project an input value to multiple points based on the random value; generate an intermediate value based on each of the multiple points; and add the intermediate values to generate the output result.

In some embodiments, the one or more secure operations include: platform attestation including an ECDSA (Elliptic Curve Digital Signature Algorithm) Sign operation; or key exchange utilizing an ECDH (Elliptic Curve Diffie-Hellman) operation.

In some embodiments, a method includes receiving a request to perform a secure operation in a computing system; and performing an elliptic curve scalar multiplication (ESM) operation for the secure operation according to an algorithm, the ESM operation including application of a secret scalar value; wherein the algorithm provides one or more countermeasures to physical side channel attacks on ESM processing, the algorithm including: counting a number of leading '0' bits in the secret scalar value; skipping the number of leading '0' bits in the secret scalar value for processing; performing the ESM operation for each bit of the secret scalar value beginning with a most significant '1' bit of the secret scalar value, wherein the performance of the ESM operation includes a Point Addition operation and a Point Double operation for each bit of the secret scalar value; performing the ESM operation for a number of dummy operations, the number of dummy operations being equal to the number of leading '0' bits in the secret scalar value; and returning an output result for the ESM operation.

In some embodiments, the algorithm further includes: converting an input value for the ESM operation to random projective coordinates using a random value; generating randomized points based on the random projective coordinates; and performing the Point Addition operation and the Point Double operation on the randomized points.

In some embodiments, the method further includes performing each operation in the ESM operation in constant time.

In some embodiments, the algorithm further includes: splitting the secret scalar value into a first scalar value and a second scalar value based on a random value; projecting an input value to multiple points based on the random value; generating an intermediate value based on each of the multiple points; and adding the intermediate values to generate the output result.

In some embodiments, the one or more countermeasures to physical side channel attacks include countermeasures to one or more of timing, power, and electromagnetic (EM) side channel attacks.

In some embodiments, an apparatus includes means for commencing a process including an elliptic curve scalar multiplication (ESM) operation, the operation including application of a secret scalar value; means for counting a number of leading '0' bits in the secret scalar value; means for skipping the number of leading '0' bits in the secret scalar value for processing; means for performing an ESM iteration for each bit of the secret scalar value beginning with a most significant '1' bit of the secret scalar value, wherein the performance of the ESM iteration includes a Point Addition operation and a Point Double operation for each bit of the secret scalar value; means for performing an ESM operation for each of a number of dummy operations, the number of dummy operations being equal to the number of leading '0' bits in the secret scalar value; and means for returning an output result for the ESM operation.

In some embodiments, the apparatus further includes means for converting an input value for the ESM operation to random projective coordinates using a random value; and means for generating randomized points based on the random projective coordinates.

In some embodiments, the apparatus further includes means for performing the Point Addition operation and the Point Double operation on the randomized points.

In some embodiments, the apparatus further includes means for performing each operation in the ESM operation in constant time.

In some embodiments, the apparatus further includes means for splitting the secret scalar value into a first scalar value and a second scalar value based on a random value.

In some embodiments, the apparatus further includes means for projecting an input value to multiple points based on the random value; means for generating an intermediate value based on each of the multiple points; and means for adding the intermediate values to generate the output result.

In some embodiments, the process includes one or more of platform attestation or key exchange.

In some embodiments, the process includes one of an ECDSA (Elliptic Curve Digital Signature Algorithm) Sign operation; or an ECDH (Elliptic Curve Diffie-Hellman) operation.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:
    performing a secure operation in a computing system, the secure operation being one of attesting to a platform for the computing system or performing a secure key exchange for the computing system, the secure operation including:
    performing an elliptic curve scalar multiplication (ESM) operation based on data for the secure operation, the ESM operation including application of a secret scalar value including a plurality of bits;
    counting a number of leading '0' bits in the plurality of bits of the secret scalar value;
    skipping the number of leading '0' bits in the secret scalar value in processing of the secret scalar value;
    performing an ESM iteration for each bit of the secret scalar value beginning with a most significant '1' bit of the secret scalar value after the leading '0' bits, wherein the performance of the ESM iteration includes a Point Addition operation and a Point Double operation for each bit of the secret scalar value after the leading '0' bits;
    following performance of the ESM iterations for the secret scalar value, performing ESM iterations for each of a number of dummy operations, the number of dummy ESM iterations being equal to the number of leading '0' bits in the secret scalar value, wherein a total number of ESM iterations for the secret scalar value and the dummy operations equals a total number of the plurality of bits of the secret scalar value;
    returning an output result for the ESM operation; and
    applying the output result in the secure operation to attest to the platform for the computing system or to perform the secure key exchange for the computing system.

2. The one or more storage mediums of claim 1, further comprising executable computer program instructions that, when executed by one or more processors, cause the one or more processors to perform operations comprising:
    converting an input value for the ESM operation to random projective coordinates using a random value; and
    generating randomized points based on the random projective coordinates.

3. The one or more storage mediums of claim 2, further comprising executable computer program instructions that, when executed by one or more processors, cause the one or more processors to perform operations comprising:
    performing the Point Addition operation and the Point Double operation on the randomized points.

4. The one or more storage mediums of claim 2, further comprising executable computer program instructions that, when executed by one or more processors, cause the one or more processors to perform operations comprising:
    performing each operation in the ESM operation in constant time.

5. The one or more storage mediums of claim 1, further comprising executable computer program instructions that, when executed by one or more processors, cause the one or more processors to perform operations comprising:
    splitting the secret scalar value into a first scalar value and a second scalar value based on a random value.

6. The one or more storage mediums of claim 5, further comprising executable computer program instructions that, when executed by one or more processors, cause the one or more processors to perform operations comprising:
    projecting an input value to multiple points based on the random value;
    generating an intermediate value based on each of the multiple points; and
    adding the intermediate values to generate the output result.

7. The one or more storage mediums of claim 1, wherein the secure operation in the computing system includes one or more of:
    an ECDSA (Elliptic Curve Digital Signature Algorithm) Sign operation; or
    an ECDH (Elliptic Curve Diffie-Hellman) operation.

8. A system comprising:
    one or more processors including one or more processing cores, the one or more processor to perform one or more secure operations utilizing elliptic curve scalar multiplication (ESM); and
    a memory for storage of data, including data for one or more secure operations;
    wherein the one or more processors include a capability to provide one or more countermeasures to hardware side channel attacks on ESM processing, the one or more processors to perform a secure operation in the system, the secure operation being one of attesting to a platform for the system or performing a secure key exchange for the system, performance of the secure operation including the one or more processors to:
    perform an elliptic curve scalar multiplication (ESM) operation based on data for the secure operation, the ESM operation including application of a secret scalar value including a plurality of bits;
    count a number of leading '0' bits in the plurality of bits of the secret scalar value;
    skip the number of leading '0' bits in the secret scalar value in processing of the secret scalar value;
    perform an ESM iteration for each bit of the secret scalar value beginning with a most significant '1' bit of the secret scalar value after the leading '0' bits, wherein the performance of the ESM operation includes a Point Addition operation and a Point Double operation for each bit of the secret scalar value after the leading '0' bits;
    following performance of the ESM iterations for the secret scalar value, perform an ESM iteration for a number of dummy operations, the number of dummy ESM iterations being equal to the number of leading '0' bits in the secret scalar value, wherein a total number of ESM iterations for the secret scalar value and the dummy operations equals a total number of the plurality of bits of the secret scalar value;
return an output result for the ESM operation; and
apply the output result in the secure operation to attest to the platform for the system or to perform the secure key exchange for the system.

9. The system of claim 8, wherein the one or more processors are further to:
convert an input value for the ESM operation to random projective coordinates using a random value; and
generate randomized points based on the random projective coordinates.

10. The system of claim 9, wherein the one or more processors are further to:
perform the Point Addition operation and the Point Double operation on the randomized points.

11. The system of claim 9, wherein the one or more processors are to perform each operation in the ESM operation in constant time.

12. The system of claim 8, wherein the one or more processors are further to:
split the secret scalar value into a first scalar value and a second scalar value based on a random value.

13. The system of claim 12, wherein the one or more processors are further to:
project an input value to multiple points based on the random value;
generate an intermediate value based on each of the multiple points; and
add the intermediate values to generate the output result.

14. The system of claim 8, wherein the one or more secure operations include:
platform attestation including an ECDSA (Elliptic Curve Digital Signature Algorithm) Sign operation; or
key exchange utilizing an ECDH (Elliptic Curve Diffie-Hellman) operation.

15. A method comprising:
performing a secure operation in a computing system, the secure operation being one of attesting to a platform for the computing system or performing a secure key exchange for the computing system, the secure operation including:
receiving a request to perform secure operation in the computing system; and
performing an elliptic curve scalar multiplication (ESM) operation for the secure operation according to an algorithm based on data for the secure operation, the ESM operation including application of a secret scalar value including a plurality of bits;
wherein the algorithm provides one or more countermeasures to physical side channel attacks on ESM processing, the algorithm including:

counting a number of leading '0' bits in the plurality of bits of the secret scalar value;
skipping the number of leading '0' bits in the secret scalar value in processing of the leading '0' bits;
performing the ESM operation for each bit of the secret scalar value beginning with a most significant 1' bit of the secret scalar value after the leading '0' bits, wherein the performance of the ESM operation includes a Point Addition operation and a Point Double operation for each bit of the secret scalar value after the leading '0' bits;
following performance of the ESM operations for the secret scalar value, performing the ESM operation for a number of dummy ESM operations, the number of dummy operations being equal to the number of leading '0' bits in the secret scalar value, wherein a total number of ESM operations for the secret scalar value and the dummy operations equals a total number of the plurality of bits of the secret scalar value;
returning an output result for the ESM operation; and
applying the output result in the secure operation to attest to the platform for the computing system or to perform the secure key exchange for the computing system.

16. The method of claim 15, wherein the algorithm further includes:
converting an input value for the ESM operation to random projective coordinates using a random value;
generating randomized points based on the random projective coordinates; and
performing the Point Addition operation and the Point Double operation on the randomized points.

17. The method of claim 16, further comprising:
performing each operation in the ESM operation in constant time.

18. The method of claim 15, wherein the algorithm further includes:
splitting the secret scalar value into a first scalar value and a second scalar value based on a random value;
projecting an input value to multiple points based on the random value;
generating an intermediate value based on each of the multiple points; and
adding the intermediate values to generate the output result.

19. The method of claim 15, wherein the one or more countermeasures to physical side channel attacks include countermeasures to one or more of timing, power, and electromagnetic (EM) side channel attacks.

* * * * *